(12) United States Patent
Lockwood et al.

(10) Patent No.: US 7,303,030 B2
(45) Date of Patent: Dec. 4, 2007

(54) BARRIER COATED GRANULES FOR IMPROVED HARDFACING MATERIAL

(75) Inventors: Greg Lockwood, Pearland, TX (US); Anthony Griffo, The Woodlands, TX (US); Ramamurthy Viswanadham, Spring, TX (US)

(73) Assignee: Smith International, Inc., Houston, TX (US)

( * ) Notice: Subject to any disclaimer, the term of this patent is extended or adjusted under 35 U.S.C. 154(b) by 309 days.

(21) Appl. No.: 10/917,855

(22) Filed: Aug. 13, 2004

(65) Prior Publication Data

US 2005/0109545 A1    May 26, 2005

Related U.S. Application Data

(60) Provisional application No. 60/524,933, filed on Nov. 25, 2003.

(51) Int. Cl.
*E21B 10/00* (2006.01)
*B24D 3/00* (2006.01)

(52) U.S. Cl. ............... 175/374; 175/425; 175/426; 51/309

(58) Field of Classification Search ........ 175/374–375, 175/425–426; 51/309
See application file for complete search history.

(56) References Cited

U.S. PATENT DOCUMENTS

| | | | |
|---|---|---|---|
| 2,842,342 A | 7/1958 | Haglund | |
| 3,372,066 A | 3/1968 | Quaas | |
| 3,841,852 A * | 10/1974 | Wilder et al. | 51/295 |
| 4,507,151 A | 3/1985 | Simm et al. | |
| 4,609,401 A | 9/1986 | Simm et al. | |
| 4,854,405 A | 8/1989 | Stroud | |
| 5,051,112 A * | 9/1991 | Keshavan et al. | 51/309 |
| 5,351,769 A * | 10/1994 | Scott et al. | 175/374 |
| 5,433,280 A * | 7/1995 | Smith | 175/336 |
| 5,791,422 A * | 8/1998 | Liang et al. | 175/374 |
| 6,138,779 A | 10/2000 | Boyce | 175/374 |
| 6,394,202 B2 * | 5/2002 | Truax et al. | 175/434 |
| 6,469,278 B1 | 10/2002 | Boyce | 219/146.1 |
| 6,601,662 B2 | 8/2003 | Matthias | |

FOREIGN PATENT DOCUMENTS

| | | |
|---|---|---|
| GB | 2315777 | 11/1998 |
| SU | 466959 A1 | 4/1975 |
| SU | 1699713 A1 | 12/1991 |
| WO | WO 2004/040095 A1 | 5/2004 |

OTHER PUBLICATIONS

United Kingdom Combined Search and Examination Report dated Oct. 25, 2004 (6 pages).
United Kingdom Combined Search and Examination Report dated Feb. 22, 2005 (6 pages).
Canadian Office Action dated Mar. 12, 2007 issued in CA Application No. 2,488,221 (3 pages).

\* cited by examiner

*Primary Examiner*—David Bagnell
*Assistant Examiner*—Giovanna M Collins
(74) *Attorney, Agent, or Firm*—Osha Liang LLP

(57) ABSTRACT

A hardfacing composition for a drill bit includes a carbide phase made from carbide particles having a barrier coating disposed thereon, and binder alloy. Also, a drill bit includes a steel bit body having hardfacing thereon and having at least one blade thereon, at least one cutter pocket disposed on the blade, at least one cutter disposed in the cutter pocket; and hardfacing applied to at least composition that includes a carbide phase formed from carbide particles having a barrier coating disposed thereon; and a binder alloy.

17 Claims, 5 Drawing Sheets

BARRIER COATED GRANULES FOR IMPROVED HARDFACING MATERIAL

CROSS-REFERENCE TO RELATED APPLICATIONS

This application claims benefit to U.S. Provisional Application Ser. No. 60/524,933, filed Nov. 25, 2003. This provisional application is hereby incorporated by reference in its entirety.

BACKGROUND OF INVENTION

1. Field of the Invention

The invention relates generally to techniques and compositions which provide improved hardfacing materials. In particular, the present invention relates to compositions for use in hardfacing milled-teeth bits.

2. Background Art

Bits for drilling oil wells (e.g., "rock bits") typically have steel bodies ("bit bodies") that are connected at the bottom of drill strings. One or more roller cones are rotatably mounted to the bit body. These roller cones have a plurality of teeth attached thereto. These teeth crush, gouge, and scrape rock at the bottom of a hole being drilled. Several types of roller cone drill bits are available for drilling wellbores through earth formations, including insert bits (e.g., tungsten carbide insert bit—"TCI") and milled tooth bits. The following illustration and discussion will use the milled tooth bits as examples. It should be noted, however, that the invention is not limited to this type of bits. Instead, the invention is applicable to any rock bit or drag bit.

Milled tooth bits include one or more roller cones rotatably mounted to a bit body. The one or more roller cones are typically made from steel and include a plurality of teeth formed integrally with the material from which the roller cones are made. Typically, a hardfacing material is applied, such as by arc or gas welding, to the exterior surface of the teeth to improve the wear resistance of the teeth. The hardfacing material typically includes one or more metal carbides, which are bonded to the steel teeth by a metal alloy ("binder alloy"). In effect, the carbide particles are suspended in a matrix of metal forming a layer on the surface of the teeth. The carbide particles give the hardfacing material hardness and wear resistance, while the matrix metal provides fracture toughness to the hardfacing.

Many factors affect the durability of a hardfacing composition in a particular application. These factors include the chemical composition and physical structure (size and shape) of the carbides, the chemical composition and microstructure of the matrix metal or alloy, and the relative proportions of the carbide materials to one another and to the matrix metal or alloy.

The metal carbide most commonly used in hardfacing is tungsten carbide. Small amounts of tantalum carbide and titanium carbide may also be present in such material, although these other carbides may be considered to be deleterious.

Many different types of tungsten carbides are known based on their different chemical compositions and physical structure. Three types of tungsten carbide commonly used in hardfacing drill bits are cast tungsten carbide, macro-crystalline tungsten carbide, and cemented tungsten carbide (also known as sintered tungsten carbide).

Cemented tungsten carbide refers to a material formed by mixing particles of tungsten carbide, typically monotungsten carbide, and particles of cobalt or other iron group metal, and sintering the mixture. In a typical process for making cemented tungsten carbide, small tungsten carbide particles, e.g., 1-15 microns, and cobalt particles are vigorously mixed with a small amount of organic wax which serves as a temporary binder. An organic solvent may be used to promote uniform mixing. The mixture may be prepared for sintering by either of two techniques: it may be pressed into solid bodies often referred to as green compacts; alternatively, it may be formed into granules or particles such as by pressing through a screen, or tumbling and then screened to obtain more or less uniform particle size.

Such green compacts or particles are then heated in a vacuum furnace to first evaporate the wax and then to a temperature near the melting point of cobalt (or the like) to cause the tungsten carbide particles to be bonded together by the metallic phase. After sintering, the compacts are crushed and screened for the desired particle size. Similarly, the sintered particles, which tend to bond together during sintering, are gently churned in a ball mill with media to separate them without damaging the particles. Some particles may be crushed to break them apart. These are also screened to obtain a desired particle size. The crushed cemented carbide is generally more angular than the particles which tend to be rounded.

Another type of tungsten carbide is macro-crystalline carbide. This material is essentially stoichiometric tungsten carbide created by a thermite process. Most of the macro-crystalline tungsten carbide is in the form of single crystals, but some bicrystals of tungsten carbide may also form in larger particles. Single crystal stoichiometric tungsten carbide is commercially available from Kennametal, Inc., Fallon, Nev.

Carburized carbide is yet another type of tungsten carbide. Carburized tungsten carbide is a product of the solid-state diffusion of carbon into tungsten metal at high temperatures in a protective atmosphere. Sometimes, it is referred to as fully carburized tungsten carbide. Such carburized tungsten carbide grains usually are multi-crystalline, i.e., they are composed of tungsten carbide agglomerates. The agglomerates form grains that are larger than the individual tungsten carbide crystals. These large grains make it possible for a metal infiltrant or an infiltration binder to infiltrate a powder of such large grains. On the other hand, fine grain powders, e.g., grains less than 5 μm, do not infiltrate satisfactorily. Typical carburized tungsten carbide contains a minimum of 99.8% by weight of tungsten carbide, with a total carbon content in the range of about 6.08% to about 6.18% by weight.

Regardless of the type of hardfacing material used, designers continue to seek improved properties (such as improved wear resistance, thermal resistance, etc.) in the hardfacing materials. Unfortunately, increasing wear resistance usually results in a loss in toughness, or vice-versa. One suggested technique has been to apply a "coating" layer around a hardfacing granule.

U.S. Pat. No. 6,138,779 (the '779 patent) discloses a technique of coating cubic boron nitride particles with tungsten carbide particles or a ceramic to provide a thermal barrier to prevent thermal degradation of the particle into a reduced wear resistant phase.

In particular, the '779 patent discloses a hardfacing composition to protect wear surfaces of drill bits and other downhole tools that consists of coated cubic boron nitride particles or coated particles of other ceramic, superabrasive or superhard materials dispersed within and bonded to a matrix deposit. The coating on the ceramic particles or particles of other hard materials may be formed from materials and alloys such as tungsten carbide, and tungsten carbide/cobalt and cermets such as metal carbides and metal nitrides. The coated particles are preferably sintered and have a generally spherical shape. The coated particles are pre-mixed with selected materials such that welding and cooling will form both metallurgical bonds and mechanical bonds within the solidified matrix deposit.

A welding rod may be prepared by placing a mixture of selected hard particles such as coated cubic boron nitride particles, hard particles such as tungsten carbide/cobalt, and loose filler material into a steel tube. A substrate may be hardfaced by progressively melting the welding rod onto a selected surface of the substrate and allowing the melted material to solidify and form the desired hardfacing with coated cubic boron nitride particles dispersed within the matrix deposit on the substrate surface.

However, while this coating may improve the thermal resistance, the hardfacing composition has in service limitations due to the brittle nature of the superhard family of materials, including boron nitride and silicon nitride.

SUMMARY OF INVENTION

In one aspect, the present invention relates to a hardfacing composition for a drill bit that includes a carbide phase made from carbide particles having a barrier coating disposed thereon, and a binder alloy.

In one aspect the present invention relates to a drill bit that includes a steel bit body having hardfacing thereon and having at least one blade thereon, at least one cutter pocket disposed on the blade, at least one cutter disposed in the cutter pocket; and hardfacing applied to at least a select portion of the drill bit, the hardfacing being formed with a hardfacing composition that includes a carbide phase formed from carbide particles having a barrier coating disposed thereon; and a binder alloy.

In one aspect, the present invention relates to a roller cone drill bit that includes a bit body; and at least one roller cone rotatably mounted to the bit body, the at least one roller cone including at least one cutting element, the at least one cutting element having on an exterior surface thereof a hardfacing, the hardfacing being formed with a hardfacing composition including a carbide phase formed from carbide particles having a barrier coating disposed thereon; and a binder alloy.

Other aspects and advantages of the invention will be apparent from the following description and the appended claims.

DETAILED DESCRIPTION

Figure 1:
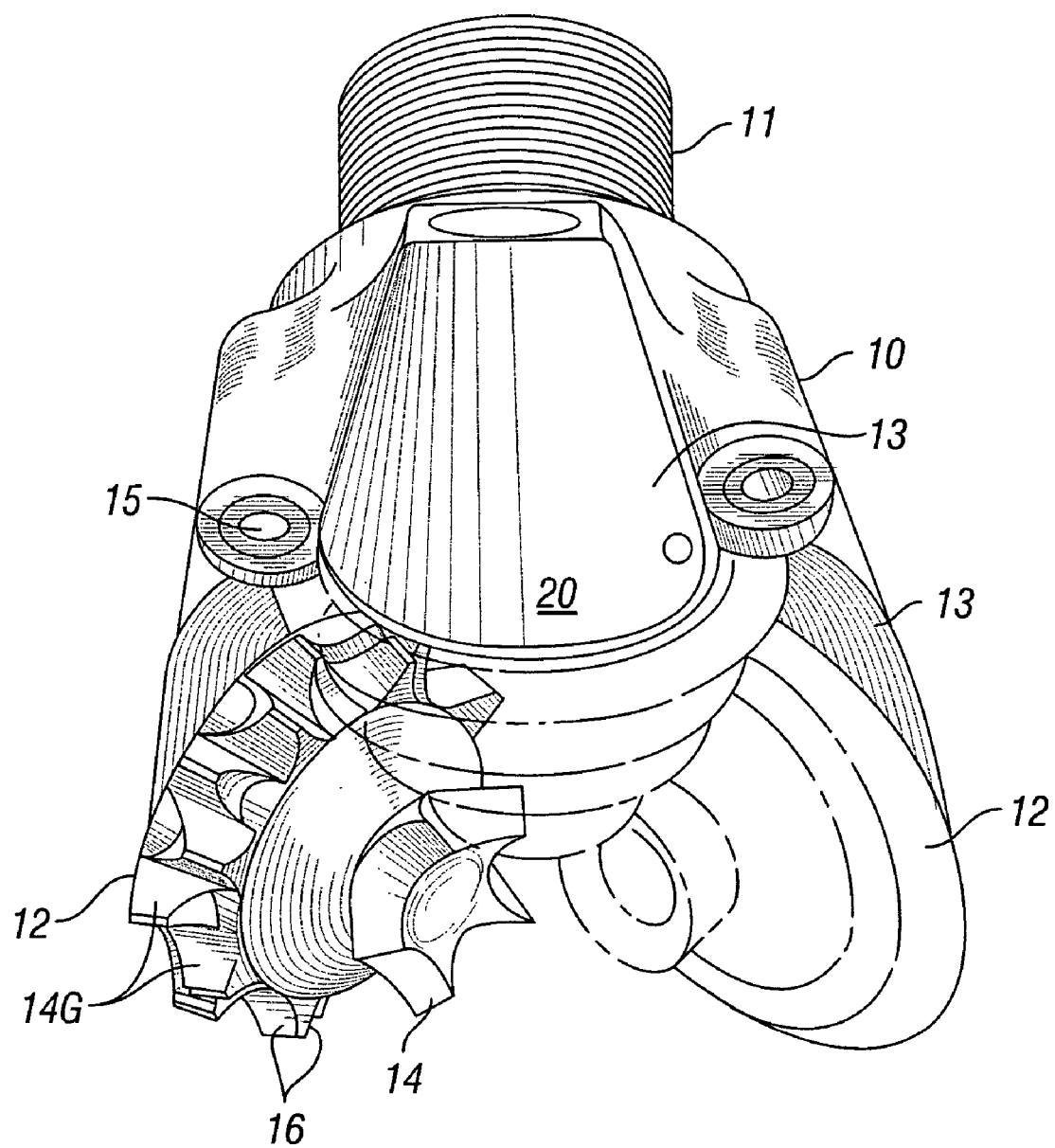
FIG. 1 shows an example of a milled tooth roller cone rock bit.

Embodiments of the invention relate to providing a "diffusion barrier coating" onto the surface of hardfacing granules. Particular embodiments relate to providing a metallic coating of cobalt, nickel, or iron onto tungsten carbide to form "coated particles." Typical hardfacing materials, according to the invention, comprise sintered tungsten carbide particles, crushed cast tungsten carbide particles, and carburized tungsten carbide. The sintered tungsten carbide particles are cemented by 6 percent cobalt by weight, and may be in the form of generally spherical or crushed.

The coated particles are applied in some embodiments as a filler in a steel tube. The hardfacing filler materials may further comprise deoxidizer and resin. When the coated particles are applied to drill bits, the coated particles are in a matrix of alloy steel welded to the drill bits.

An example of a milled tooth roller cone drill bit includes a steel body 10 having a threaded coupling ("pin") 11 at one end for connection to a conventional drill string (not shown). At the opposite end of the drill bit body 10 there are three roller cones 12, for drilling earth formations to form an oil well or the like ("wellbore"). Each of the roller cones 12 is rotatably mounted on a journal pin (not shown in FIG. 1) extending diagonally inwardly on each one of the three legs 13 extending downwardly from the bit body 10. As the bit is rotated by the drill string (not shown) to which it is attached, the roller cones 12 effectively roll on the bottom of the wellbore being drilled. The roller cones 12 are shaped and mounted so that as they roll, teeth 14 on the cones 12 gouge, chip, crush, abrade, and/or erode the earth formations (not shown) at the bottom of the wellbore. The teeth 14G in the row around the heel of the cone 12 are referred to as the "gage row" teeth. They engage the bottom of the hole being drilled near its perimeter or "gage." Fluid nozzles 15 direct drilling fluid ("mud") into the hole to carry away the particles of formation created by the drilling.

Such a roller cone rock bit as shown in FIG. 1 is conventional and is therefore merely one example of various arrangements that may be used in a rock bit which is made according to the invention. For example, most roller cone rock bits have three roller cones as illustrated in FIG. 1. However, one, two and four roller cone drill bits are also known in the art. Therefore, the number of such roller cones on a drill bit is not intended to be a limitation on the scope of the invention. In addition, embodiments of the invention apply equally well to drag bits.

The arrangement of the teeth 14 on the cones 12 shown in FIG. 1 is just one of many possible variations. In fact, it is typical that the teeth on the three cones on a rock bit differ from each other so that different portions of the bottom of the hole are engaged by each of the three roller cones so that collectively the entire bottom of the hole is drilled. A broad variety of tooth and cone geometries are known and do not form a specific part of this invention, nor should the invention be limited in scope by any such arrangement.

In addition, while embodiments of the present invention describe hardfacing teeth, embodiments of the present invention may be used to provide erosion protection for steel body fixed cutter diamond bits, or other types of bits as known in the art. The specific descriptions provided below do not limit the scope of the invention, but rather provide illustrative examples. Those having ordinary skill in the art will appreciate that the hardfacing compositions may be used on other types of and locations on drill bits.

Figure 2:
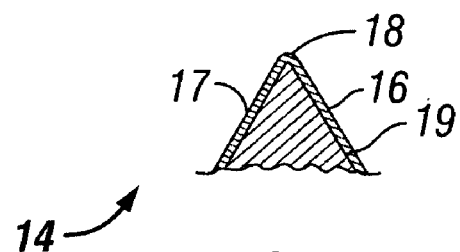
FIG. 2 shows a cross-section of an example of a milled tooth.

The example teeth on the roller cones shown in FIG. 1 are generally triangular in a cross-section taken in a radial plane of the cone. Referring to FIG. 2, such a tooth 14 has a leading flank 16 and a trailing flank 17 meeting in an elongated crest 18. The flank of the tooth 14 is covered with a hardfacing layer 19. Sometimes only the leading face of each such tooth 14 is covered with a hardfacing layer so that differential erosion between the wear-resistant hardfacing on the front flank of a tooth and the less wear-resistant steel on the trailing face of the tooth tends to keep the crest of the tooth relatively sharp for enhanced penetration of the rock being drilled.

The leading flank 16 of the tooth 14 is the face that tends to bear against the undrilled rock as the rock bit is rotated in the wellbore. Because of the various cone angles of different teeth on a roller cone relative to the angle of the journal pin on which each cone is mounted, the leading flank on the teeth in one row on the same cone may face in the direction of rotation of the bit, whereas the leading flank on teeth in another row may on the same cone face away from the direction of rotation of the bit. In other cases, particularly near the axis of the bit, neither flank can be uniformly regarded as the leading flank, and both flanks may be provided with a hardfacing. There are also times when the ends of a tooth, that is, the portions facing the more or less axial direction on the cone, are also provided with a layer of hardfacing. This is particularly true on the so-called gage surface of the bit which is often provided with a hardfacing.

The gage surface is a generally conical surface at the heel of a cone which engages the side wall of a hole as the bit is used. The gage surface includes the outer end of teeth in the so-called gage row of teeth nearest the heel of the cone and may include additional area nearer the axis of the cone than the root between the teeth. The gage surface is not considered to include the leading and trailing flanks of the gage row teeth. The gage surface encounters the side wall of the hole in a complex scraping motion which induces wear of the gage surface. In some drill bits, hardfacing may also be applied on the shirttail (20 in FIG. 1) at the bottom of each leg on the bit body.

Figure 3A:
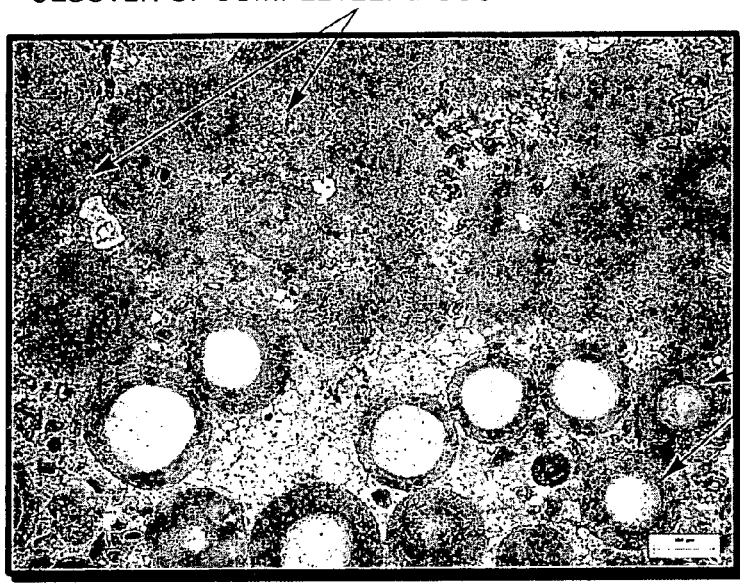
FIGS. 3a and 3b show prior art tungsten carbide-cobalt particles.
Figure 3B:
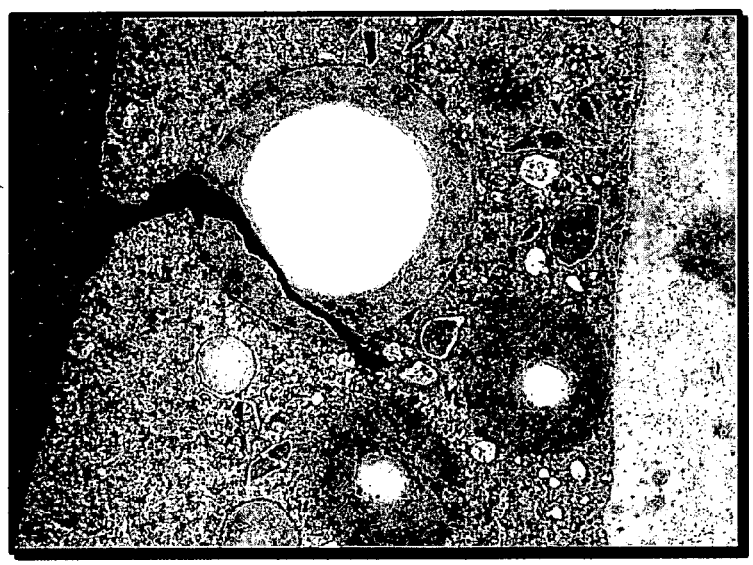

It is well known, however, that as the steel tube rod melts (during application of the hardfacing), cobalt from the tungsten carbide-cobalt granules diffuses into the weld pool, and steel from the "weld pool" diffuses into the granules. This has been quantified using quantitative EDS using a Jeol scanning electron microscope. A polish and chemical etch of the cross-section of the weld material as seen using an inverted light microscope, reveals a halo surrounding the granules (See FIGS. 3A and 3B). This halo results in a granule diameter that is 30% to 70% less than the starting diameter (before welding). Lab and field tests confirmed that this causes a significant drop in wear resistance and provides a relatively easy path for crack propagation through the brittle halo layer. These features are shown in FIGS. 3a and 3b. FIG. 3a illustrates tungsten carbide-cobalt particles that have dissolved into a surrounding steel matrix. This is partially evidenced by the loss of a spherical shape. FIG. 3b illustrates a tungsten carbide/cobalt particle having a crack running through the halo layer. A weld with thick halos surrounding the granules or with a high degree of loosely bound fine tungsten carbide particles reduces toughness. The reduced toughness, or crack propagation resistance, has severe consequences on a drill bit. Special design and welding techniques are needed for a sound weld of the crest 18 area of a tooth 14 (FIG. 2). The loss of toughness leads to premature chipping and breakage of the crest 18, reducing the life and rate of penetration of the drill bit.

Carbide particles are often measured in a range of mesh sizes, for example 40 to 80 mesh. The term "mesh" actually refers to the size of the wire mesh used to screen the carbide particles. For example, "40 mesh" indicates a wire mesh screen with forty holes per linear inch, where the holes are defined by the crisscrossing strands of wire in the mesh. The hole size is determined by the number of meshes per inch and the wire size. The mesh sizes referred to herein are U.S. Standard Sieve Series mesh sizes, also described as ASTM E11. A standard 40 mesh screen has holes such that only particles having a dimension less than 420 µm can pass. That is, particles larger than 420 µm in size will be retained on a 40 mesh screen, while particles smaller than 420 µm will pass through the screen.

Therefore, the range of sizes of the carbide particles in a filler is defined by the largest and smallest grade of mesh used to screen the particles. An exemplary filler comprising carbide particles in the range of from 16 to 40 mesh will only contain particles larger than 420 µm and smaller than 1190 µm, whereas another filler comprising particles in the range of from 40 to 80 mesh will only contain particles larger than 180 µm and smaller than 420 µm. Hence, there is no overlap in terms of particle size between these two ranges.

Some embodiments of the invention may include one or more of the following types and sizes of carbides: sintered carbide, in the form of crushed or spherical particles and preferably having a size in the range of about 16-30 ASTM mesh, 30 to 40 ASTM mesh, and/or 100 to 325 ASTM mesh; crushed cast carbide, preferably having a particle size in a range of about 40-80 ASTM mesh; and macro-crystalline tungsten carbide, preferably having a particle size in a range of less than about 80 ASTM mesh, preferably about 100-200 ASTM mesh. It is often desirable to use small hard particles to fit in the gaps between the larger, 16 to 40 mesh particles. These smaller particles of 100 to 325 mesh are more prone to damage due to the high imposed temperature during welding.

In one embodiment, sintered tungsten carbide particles, in the form of particles, having a size of 16 to 40 mesh, were coated with a "diffusion barrier coating." In this embodiment, nickel was used as the diffusion barrier coating. The nickel is deposited so as to have a thickness preferably between about 0.0002 and 0.003 inches (5 to 76 micrometers), more preferably between about 0.0006 and 0.0013 inches (15 to 33 micrometers). In alternative embodiments, cobalt, iron, or mixtures of cobalt, iron, and nickel may be used as the coating.

One method for depositing the barrier coating in accordance with the present invention uses "electroless" chemical bath immersion techniques similar to those described in U.S. Pat. Nos. 6,183,546 and 6,066,406 both issued to McComas, the disclosures of which are hereby incorporated by reference. Generally, the techniques disclosed in the McComas '546 and '406 patents include immersing the selected components in a chemical bath having therein nickel ions and a borohydride reducing agent for a selected time.

The time is selected to provide a desired thickness of a boron and nickel containing layer on the selected components. The selected components are then heat treated for a period of time at temperatures of 375 to 750° F. In embodiments of a roller cone and a drill bit made according to the invention, and in methods of making a bit and components thereof according to the invention, it is preferred to heat treat the selected components at not more than about 450° F.

In a typical embodiment, hardfacing granules ("the substrate") are contacted with an electroless plating bath to plate metal on those areas of the substrate on which the sensitizing and activating materials (i.e., the borohydride reducing agent) are deposited. In a preferred embodiment, the electroless plating bath is a nickel bath. Electroless nickel plating baths are available commercially. An example of one such bath is a Nicklad 1000 bath that is obtained from the Kelite Division, Witco Chemical Co., Melrose Park, Ill.

Nickel is plated on the substrate by depositing the substrate in the nickel bath at an elevated temperature for an amount of time sufficient to plate the desired amount of metal on the substrate. For example, to deposit metal lines that are about 1 μm thick on a substrate, the substrate is deposited in a bath at a temperature of about 80° C. to about 95° C. for about 15 minutes. After the nickel is deposited, the substrate is again heated.

The substrate is heated to a temperature of at least about 180° C. to achieve the desired adhesion in less than 24 hours. If the substrate is heated to about 250° C., the desired adhesion is obtained in about 60 minutes. It is advantageous if the substrate is not heated to a temperature that exceeds about 350° C.

In this embodiment, therefore, a nickel containing diffusion barrier may be applied having a selected thickness. The diffusion barrier reduces or prevents the transfer of metal (often occurring during the hardfacing application process) to and from the hardfacing granules. The nickel coated, sintered tungsten carbide particles of this embodiment may then be used as part of a hardfacing composition, as described below. In addition to reducing or preventing metal diffusion, by providing a barrier coating in this manner, embodiments of the present invention prevent or reduce the formation of a "halo" as described in reference to the '779 patent above. Further, by providing the barrier coating, the nominal particle size (e.g., 16 to 40 mesh in this embodiment) may be maintained. Without such a barrier coating, metal diffusion results in a decrease in diameter of the tungsten carbide particles, which causes a reduced wear resistance and toughness.

Figure 4A:
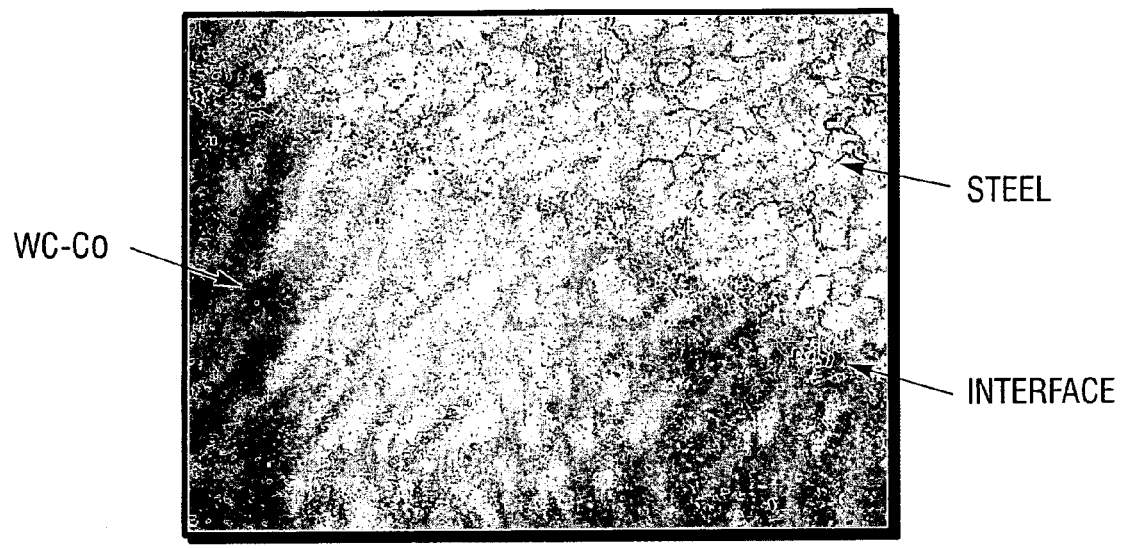
FIGS. 4a and 4b show a comparison between tungsten carbide particles formed in accordance with embodiments of the present invention and prior art particles.
Figure 4B:
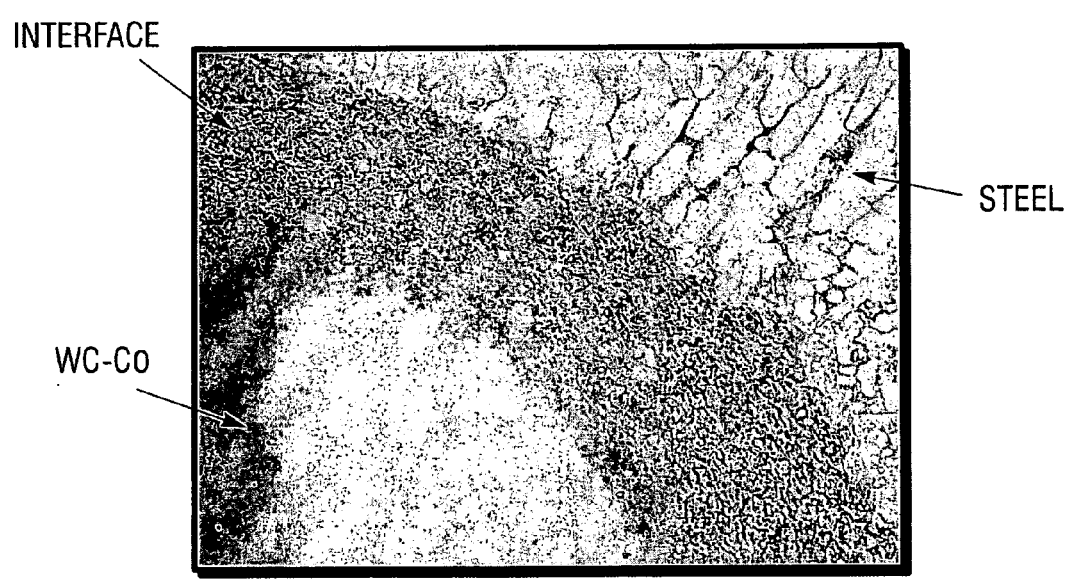

FIGS. 4a and 4b illustrate the differences between the present method and typical prior art techniques. In FIG. 4a, a nickel coated tungsten carbide-cobalt particle is shown at a magnification of 500. FIG. 4a shows a distinct layer separating the surrounding steel matrix from the cemented tungsten-carbide hardfacing granule. In contrast, in FIG. 4b, which shows a conventional tungsten-carbide particle at the same magnification, significant metal diffusion has occurred (evidenced by the lack of a distinct boundary between the cemented tungsten carbide particle and surrounding matrix).

MCP process is a marketing name for Advanced Ceramics Corporation's (Cleveland, Ohio) Metal Coated Particulate technology. It is an electroplating process where nickel ions travel from 99.99% high purity metal bars (anode) through an electrolyte solution and attach to the particles to be coated (cathode). The particles and solution are periodically stirred to maintain a uniform coating. When the desired thickness is achieved, the coated particles are washed and then heated in a vacuum to drive off moisture. An advantage of MCP technology is that coating coverage is uniform and complete, and deposition is ten times faster than other techniques, which lowers cost.

Figure 5:
FIG. 5 shows tungsten carbide particles formed in accordance with some embodiments of the present invention in a metal matrix.

FIG. 5 shows coated particles formed in accordance with the present invention at a magnification of 100. In particular, FIG. 5 shows that distinct boundaries between the particles and the surrounding matrix exist.

Figure 6:
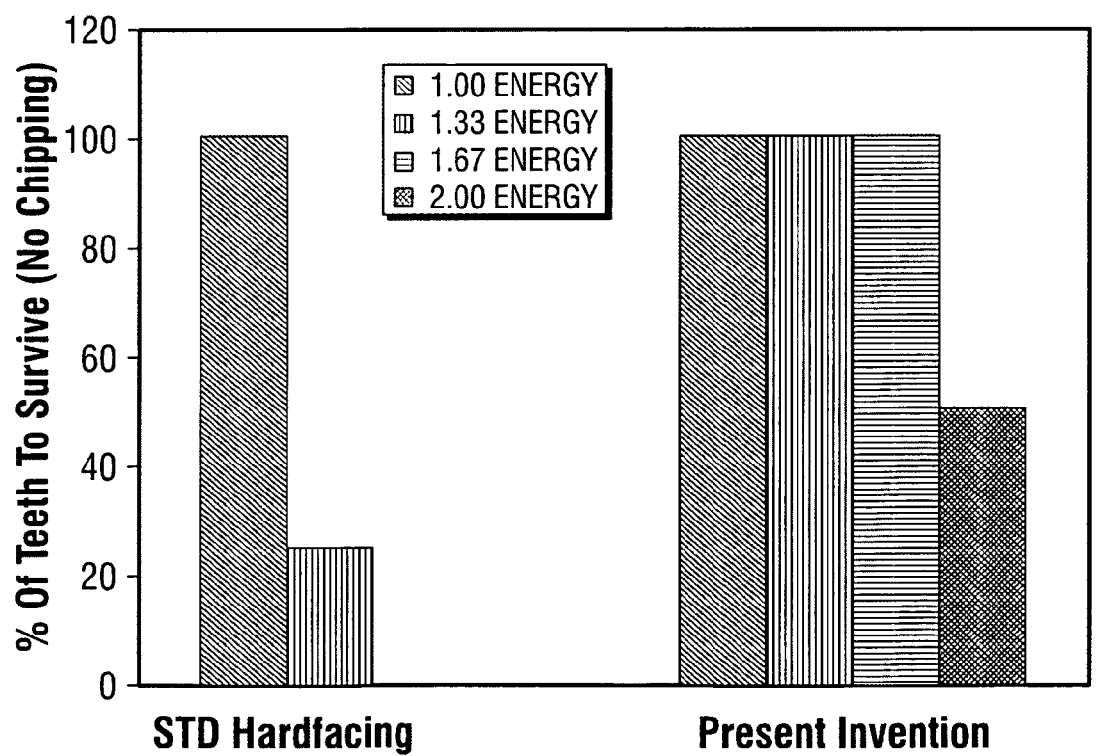
FIG. 6 shows impact test results from some embodiments of the present invention, compared with standard hardfacing.

FIG. 6 illustrates the impact test properties of inserts made in accordance with embodiments of the present invention. In FIG. 6 impact energy (absorbed energy) is normalized. If the tooth chipped, it was considered a failure; if no chipping, then it passed at that energy. The higher the number, or energy absorbed, the greater the impact property. The Nickel coated inserts provided at least 67% greater energy absorption in impact (ratio of 1.67). At that level of impact energy the standard (uncoated) had a passing level of 25% (1 out of 4 teeth), while the coated particles grade had a passing level of 100% (4 out of 4 tested).

In an alternative method, a chemical vapor deposition (CVD) systems or reactors may be used to deposit or grow thin films of barrier coatings upon the hardfacing granules. CVD systems operate by introducing a process gas or chemical vapor into a deposition chamber in which a substrate to be processed has been placed. The gaseous source chemicals pass over the substrate, are adsorbed and react on the surface of the substrate to deposit the film. Various inert carrier gases may also be used to carry a solid or liquid source into the deposition chamber in a vapor form. Typically, the substrate is heated from 200 to 900° C. to initiate the reaction.

One type of CVD system used in manufacturing is an atmospheric pressure chemical vapor deposition system (hereinafter APCVD system). APCVD systems are described in, for example, U.S. Pat. No. 4,834,020, to Bartholomew et al., which is incorporated herein by reference. In an APCVD system, a deposition chamber is maintained at atmospheric pressure while gaseous source chemicals are introduced to react and deposit a film on the substrate. A typical APCVD system uses a belt or conveyor to move the substrates through the deposition chamber during the deposition process.

Because this design allows uninterrupted processing of substrates, and because APCVD systems generally provide a higher rate of film growth than, for example, low pressure CVD systems in which the chamber must be evacuated prior to each deposition process, belt-driven APCVD systems typically provide a much greater substrate throughput.

Other coating processes are known in the art, and the above descriptions are not intended to limit the scope of the present invention. In particular, other plating techniques may be used. Those of ordinary skill in the art, having reference to this disclosure, will recognize that a number of other methods may be used to deposit the barrier coating in accordance with the present invention.

Figure 7:
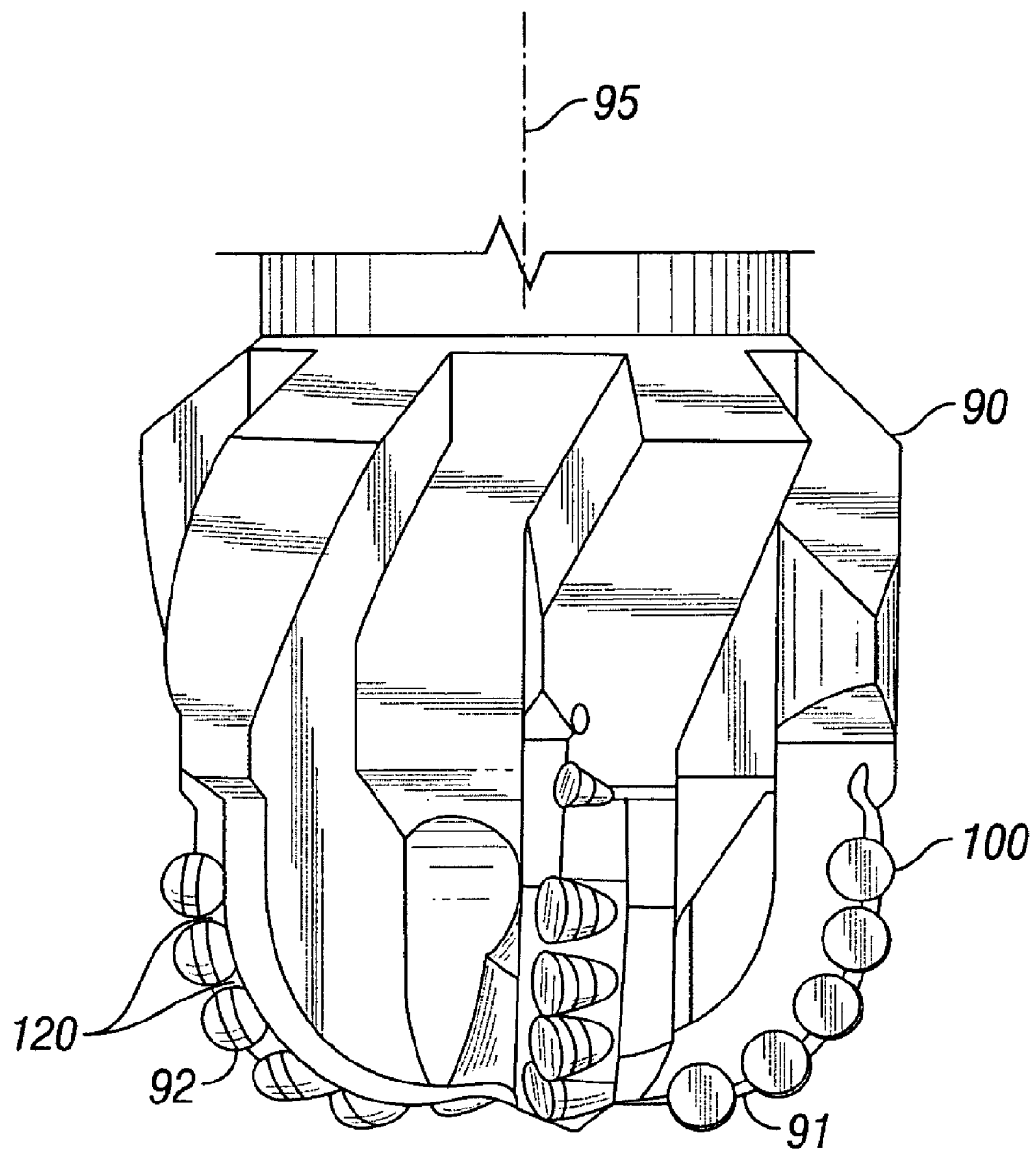
FIG. 7 shows some embodiments of the present invention used with a fixed cutter bit.

As stated above, embodiments of the present invention apply equally well to fixed cutter bits. For example, FIG. 7 shows a steel drill bit body 90 comprising at least one PDC cutter 100. The steel drill bit body 90 is formed with at least one blade 91, which extends generally outwardly away from a central longitudinal axis 95 of the drill bit 90.

In the present embodiment, the steel drill bit body 90 includes a hardfacing layer 120, which includes a carbide phase formed from carbide particles having a barrier coating disposed thereon, and a binder alloy. As with the above, the hardfacing layer 120 may be applied using any technique known in the art, such as "tube," thermal spray, or arc hardfacing. The PDC cutter 100 is disposed on the blade 91. The number of blades 91 and/or cutters 100 is related, among other factors, to the type of formation to be drilled, and can thus be varied to meet particular drilling requirements.

The PDC cutter 100 may be formed from a sintered tungsten carbide composite substrate (not shown separately in FIG. 7) and a polycrystalline diamond compact (not shown separately in FIG. 7), among other materials. The polycrystalline diamond compact and the sintered tungsten carbide substrate may be bonded together using any method known in the art. In addition to steel body bits, embodiments of the present invention may be used in connection with matrix body bits, should the need for hardfacing be present.

After being provided with the diffusion barrier coating described above, the coated particles may be applied as a hardfacing layer to the teeth and/or shirttail using processes well known in the art. One such process is atomic hydrogen welding. Another process is oxyacetylene welding. Other processes include plasma transferred arc ("PTA"), gas tungsten arc, shield metal arc processes, laser cladding, and other thermal deposition processes. In oxyacetylene welding, for example, the hardfacing material is typically supplied in the form of a tube or hollow rod ("a welding tube"), which is filled with coated particles having a selected composition. The tube is usually made of steel (iron) or similar metal (e.g., nickel and cobalt) which can act as a binder when the rod and its granular contents are heated.

The tube thickness is selected so that its metal forms a selected fraction of the total composition of the hardfacing material as applied to the drill bit. The granular filler of the rod or tube typically includes various forms of metal carbides (e.g., tungsten, molybdenum, tantalum, niobium, chromium, and vanadium carbides), and most typically, various forms of tungsten carbide. Alternatively, the binder alloy may be in the form of a wire ("a welding wire") and the hardfacing materials are coated on the wire using resin binders. With a PTA welding process, the hardfacing materials may be supplied in the form of a welding tube, a welding wire, or powder, although the powder form is preferred.

Other methods and techniques for applying hardfacing materials are known in the art and are omitted here for the sake of clarity. It should be noted that while oxyacetylene welding is the preferred method of applying the improved hardfacing composition (including the coated particles) disclosed herein, any suitable method may be employed.

Advantageously, embodiments of the present invention provide coated particles that have a diffusion barrier to prevent or reduce the transfer of metal to and from the granules. Therefore, embodiments of the present invention advantageously provide coated particles that maintain their diameters after welding. It has been discovered that larger diameter granules may improve the life and rate of penetration for drill bits. Further, embodiments of the present invention provide a hardfacing composition having an improved toughness. Not only does the composition have improved toughness and impact properties, but without sacrificing wear resistance. The added metal content from the coating is not enough to reduce wear resistance. Advantageously, compositions of the present invention make the tube rod (used during the application of a hardfacing layer) easier to weld, and help ensure that the weld quality is less dependant on the skill level of the welder.

In addition, while reference has been made to tungsten carbide and cobalt containing materials, other transition metal carbides, transition metal nitrides, and other suitable superhard materials are specifically within the scope of the present invention. That is, the coating techniques described above, may be used with materials other than the tungsten carbide compositions disclosed above.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A hardfacing composition for a drill bit, comprising:
a carbide phase comprising
sintered tungsten carbide particles having a barrier coating disposed thereon; and
a binder alloy;
wherein the barrier coating is formed from at least one of cobalt, nickel, and iron, or alloys thereof.

2. The hardfacing composition as defined in claim 1, wherein the sintered tungsten carbide particles comprise sintered tungsten carbide particles having a size in a range of about 16 to 40 mesh.

3. The hardfacing composition as defined in claim 1, wherein the sintered tungsten carbide particles comprise sintered tungsten carbide particles having a size in a range of about 100 to 325 mesh.

4. The hardfacing composition as defined in claim 1, wherein the binder alloy is in a form selected from a welding tube, a welding wire, and powder.

5. The hardfacing composition as defined in claim 1, wherein the barrier coating comprises a metal layer having a selected thickness.

6. The hardfacing composition as defined in claim 5, wherein the metal layer has a thickness of 0.0002 to 0.003 inches (5 to 76 micrometers).

7. The hardfacing composition as defined in claim 5, wherein the metal layer has a thickness of 0.0006 to 0.0013 inches (15 to 33 micrometers).

8. The hardfacing composition as defined in claim 1, wherein the carbide phase further comprises at least one of cast carbide, and macro-crystalline tungsten carbide.

9. A roller cone drill bit, comprising:
a bit body; and
at least one roller cone rotatably mounted to the bit body, the at least one roller cone comprising at least one cutting element the at least one cutting element having on an exterior surface thereof a hardfacing, the hardfacing being formed with a hardfacing composition comprising
a carbide phase comprising
sintered tungsten carbide particles having a barrier coating disposed thereon; and
a binder alloy;
wherein the barrier coating is formed from at least one of cobalt, nickel, and iron, or alloys thereof.

10. The drill bit as defined in claim 9, wherein the carbide particles comprise sintered tungsten carbide particles having a size in a range of about 16 to 40 mesh.

11. The drill bit as defined in claim 9, wherein the hinder alloy is in a form selected from a welding tube, a welding wire, and powder.

12. The drill bit as defined in claim 9, wherein the barrier coating comprises a metal layer having a selected thickness.

13. The drill bit as defined in claim 12, wherein the metal layer has a thickness of 0.0002 to 0.003 inches (5 to 76 micrometers).

14. The drill bit as defined in claim 12, wherein the metal layer has a thickness of 0.0006 to 0.0013 inches (15 to 33 micrometers).

15. The roller cone drill bit as defined in claim 9, wherein the carbide phase further comprises at least one of, cast carbide, and macro-crystalline tungsten carbide.

16. A drill bit comprising:
a steel bit body having hardfacing thereon and having at least one blade thereon;
at least one cutter pocket disposed on the blade;
at least one cutter disposed in the cutter pocket; and
hardfacing applied to at least a select portion of the drill bit, the hardfacing being formed with a hardfacing composition comprising
a carbide phase comprising:
sintered tungsten carbide particles having a baffler coating disposed thereon; and a binder alloy;

wherein the barrier coating is formed from at least one of cobalt nickel, and iron, or alloys thereof.

17. A drill bit comprising:

a matrix bit body having at least one blade thereon;

at least one cutter pocket disposed on the blade;

at least one cuter disposed in the cuter pocket; and hardfacing applied to at least a select portion of the drill bit, the hardfacing being formed with a hardfacing composition comprising:

a carbide phase comprising sintered tungsten carbide particles having a barrier coating disposed thereon; and a binder alloy;

wherein the barrier coating is formed from at least one of cobalt, nickel, and iron, or alloys thereof.

* * * * *

UNITED STATES PATENT AND TRADEMARK OFFICE
CERTIFICATE OF CORRECTION

| | |
|---|---|
| PATENT NO. | : 7,303,030 B2 |
| APPLICATION NO. | : 10/917855 |
| DATED | : December 4, 2007 |
| INVENTOR(S) | : Gregory T. Lockwood et al. |

It is certified that error appears in the above-identified patent and that said Letters Patent is hereby corrected as shown below:

On the Cover Page:

On the cover page, section (57) Abstract, line 7, after the word "least", the words, --a select portion of the drill bit, the hardfacing being formed with a hardfacing-- should be added.

In the Claims:

In claim 9, column 10, line 28, the word, "cuffing" should be --cutting--.

In claim 11, column 10, line 41, the word "hinder" should be --binder--.

In claim 16, column 10, line 64, the word "baffler" should be --barrier--.

In claim 17, column 11, line 7, after the word "one", the word "cuter" should be --cutter--.

In claim 17, column 11, line 7, after the word "the", the word "cuter" should be --cutter--.

Signed and Sealed this

Twenty-ninth Day of April, 2008

JON W. DUDAS
*Director of the United States Patent and Trademark Office*